Oct. 17, 1967   U. CARLEVARO   3,347,173
FLOORLESS, TWO SEAT CABIN FOR CABLEWAYS
Filed July 19, 1965   2 Sheets-Sheet 1

INVENTOR
UGO CARLEVARO

BY Young + Thompson

ATTORNEYS

United States Patent Office 3,347,173
Patented Oct. 17, 1967

3,347,173
FLOORLESS, TWO SEAT CABIN FOR CABLEWAYS
Ugo Carlevaro, Via San Secondo 43, Turin, Piedmont, Italy
Filed July 19, 1965, Ser. No. 472,996
Claims priority, application Italy, Aug. 12, 1964, 17,850
6 Claims. (Cl. 104—173)

ABSTRACT OF THE DISCLOSURE

A cableway cabin for skiers having a framework with fixed seats and rear body shell, and two movable front body shells for opening and closing the cabin, mutually connected by engaging toothed wheels for moving simultaneously, all said body shells being floorless for allowing the skiers to enter the cabin without taking off the skis.

---

The present invention refers to elevated cableways, especially to those destined to the conveyance of skiers, and its object is the provision of a cabin capable of accommodating two passengers and arranged so that said passengers can be seated and carried quite safely and comfortably without the need for them to take off the skis from their feet.

For its intended purpose said cabin is without a floor, this consisting exclusively of retractable floor-rests so that at the station the skier encounters no difficulty in setting his feet on the floor of the station, whereas during the ride his feet are safely lying on said foot rests. For the same purpose, the whole front portion of the cabin can be opened, so that the passenger finds no obstacle either on the departure, when sitting down on the seat, or on the arrival, when moving quickly away from the cabin. The enclosed drawings illustrate, by way of non-restrictive exemplification, a form of embodiment of the invention.

Figure 1:
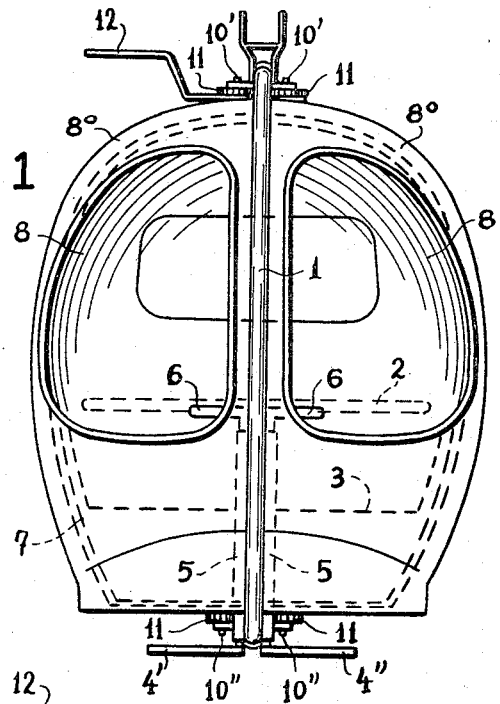
Figure 2:
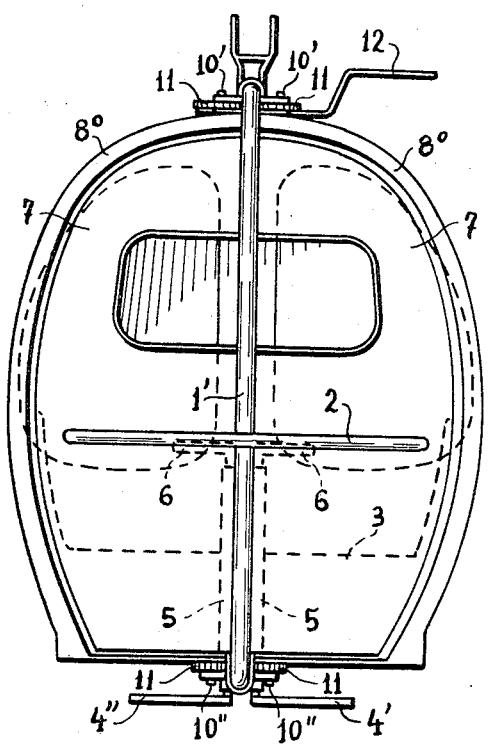
Figure 3:
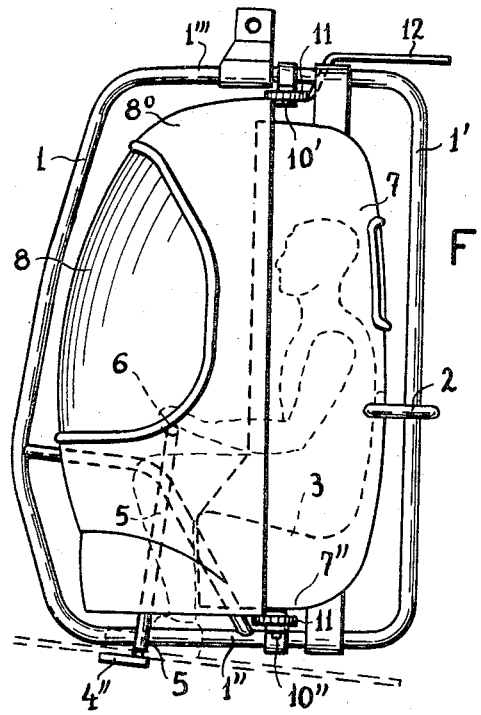
Figure 5:
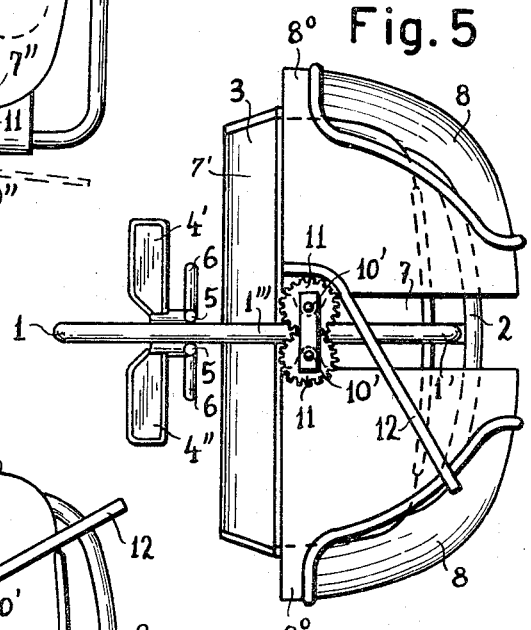
Figure 4:
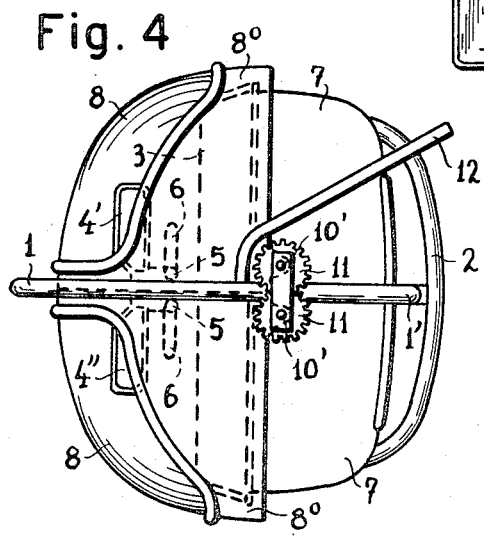

In the example:

FIG. 1 is a front elevational view of the cabin;
FIG. 2 is a view of the cabin from the rear side;
FIG. 3 is a lateral elevational view of the cabin;
FIG. 4 is a plan view of the cabin with closed doors;
FIG. 5 is a plan view of the cabin at rest with open doors.

With reference to the drawings:

No. 1 shows a metal tube frame having an essentially quadrangular shape, which makes up the central vertical structure of the cabin. To the upright 1' of the frame is fitted a rear bumper 2 which serves the purpose of protecting the body of the cabin especially when this is stored along with the others, during running breaks; structurally it contributes to support, on the ends, a double seat 3. The lower horizontal portion 1" of the frame carries two hinged foot-rests 4'-4" each provided with a column 5 with a steering handle 6 by the use of which it is possible to impart to each foot-rest approximately ¼ of a turn, thereby passing from a position parallel and adjacent to the horizontal portion 1" of the frame, to a position transverse to said portion. This device is preferably fitted with trippers apt to retain releasably the foot-rest in each of the end positions.

To the frame 1, preferably also to the bumper 2, is secured the rear portion of the cabin body 7 having an essentially semi-cylindrical shape, with a front opening 7' and a lower closure 7" on which lies the double seat.

The front portion of the body consists of two doors 8 the shape of each of which corresponds to ¼ of a barrelled cylinder and the radius of which is slightly greater than the front portion.

The upper portion 8° of each door 8 articulates with a pin 10' fitted on a support that forms part of the upper horizontal portion 1''' of the frame, whilst the lower portion is connected to a pin 10'' mounted on a support that forms part of the lower horizontal portion 1" of the frame.

Each of the two upper pins 10' is coaxial with one of the two lower pins 10'' and each pin is fixed to a gear 11, the gears of each pair being in mesh, so that the two doors swing equally and oppositely.

One of these pins carries an arm 12 protruding laterally of the cabin, so that during the ride it meets with a stop member which is located at the station and which controls its oscillation, causing the two doors 8 to open.

On the departure of the cabin, the doors are closed by a spring, possibly seconded, for better safety, by a further lever-stop pair, located on the opposite side of the cabin. The devices in question operate as follows:

On the arrival at the station the cabin opens, as already explained, through the oscillation of the doors on their pins, so that the seats are free like those of a chairlift and the passengers can sit down similarly, without taking off the skis, which lie on the floor of the station. When the cabin sets out, the two doors close and the passenger, by acting on the handle 6 brings the foot-rests under the skis, transversely to the frame 1. At the end of the ride, the doors 8 open again at the other station, and the passenger can leave the cabin after returning the foot-rest to the "off" position.

The above described structure is an example of embodiment presented in order to clearly illustrate the principles of the invention, but the details are by no means restrictive, many arrangements and shapes of the members being replaceable by technical equivalents thereof, and also by structural and constructional variants, without departing from the scope of the patent.

Having thus described my invention, what I claim is:

1. A cableway cabin, especially destined to the conveyance of skiers, comprising a central vertical framework, at least one seat secured to said framework, a floorless rear body shell secured to said framework, a first floorless front body shell mounted on said framework for rotation in a horizontal plane, a first toothed wheel solid with said first front body shell, a second floorless front body shell mounted on said framework for rotation in a horizontal plane, a second toothed wheel solid with said second front body shell and engaging with said first toothed wheel, whereby said first and second front body shells perform mutually symmetrical rotations in a horizontal plane with respect to said framework, for opening the cabin to allow at least a skier to enter the cabin and sit down on the seat without taking off the skis, and for closing the cabin after entrance of the skier.

2. A cableway cabin as claimed in claim 1, and a lever fixed to at least one of said shells for controlling the opening and closing of said shells.

3. A cableway cabin as claimed in claim 1, and a return spring connected to said framework and to at least one of said shells to urge said shells closed.

4. A cableway cabin as claimed in claim 1, there being two said seats disposed symmetrically on opposite sides of said central vertical framework.

5. A cableway cabin as claimed in claim 1, and two foot-supporting arms mounted symmetrically on opposite sides of said framework, said arms being movable between a rest position parallel to said framework and an operative position perpendicular to said framework.

6. A cableway cabin as claimed in claim 1, and at least one substantially horizontal foot-supporting arm, an upright column fixed to said arm, means pivotally mounting said column on said framework, and a control member fixed to the upper end of the column for manually swinging said arm.

References Cited

UNITED STATES PATENTS

| 523,213 | 7/1894 | King | 105—343 |
| 2,244,650 | 6/1941 | Curran | 297—390 |
| 3,094,079 | 6/1963 | Greil | 105—150 |

FOREIGN PATENTS

| 222,176 | 12/1961 | Austria. |
| 1,376,569 | 9/1964 | France. |

ARTHUR L. LA POINT, *Primary Examiner.*

D. E. WORTH, *Assistant Examiner.*